No. 839,154. PATENTED DEC. 25, 1906.
R. KLEIN.
PHOTOGRAPHIC SHUTTER.
APPLICATION FILED MAY 27, 1905.

3 SHEETS—SHEET 1.

Witnesses.
Walter B. Payne
Florence E. Franck

Inventor.
Rudolph Klein
Frederick S. Church
Attorney.

No. 839,154.  
PATENTED DEC. 25, 1906.  
R. KLEIN.  
PHOTOGRAPHIC SHUTTER.  
APPLICATION FILED MAY 27, 1905.  
3 SHEETS—SHEET 2.
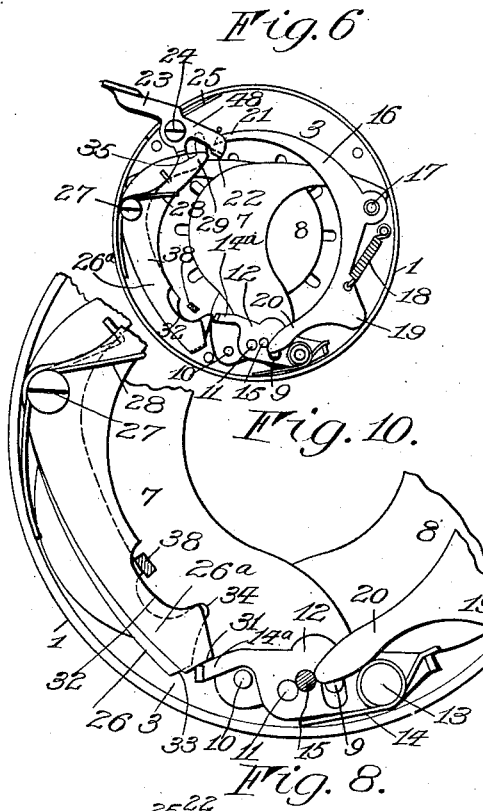
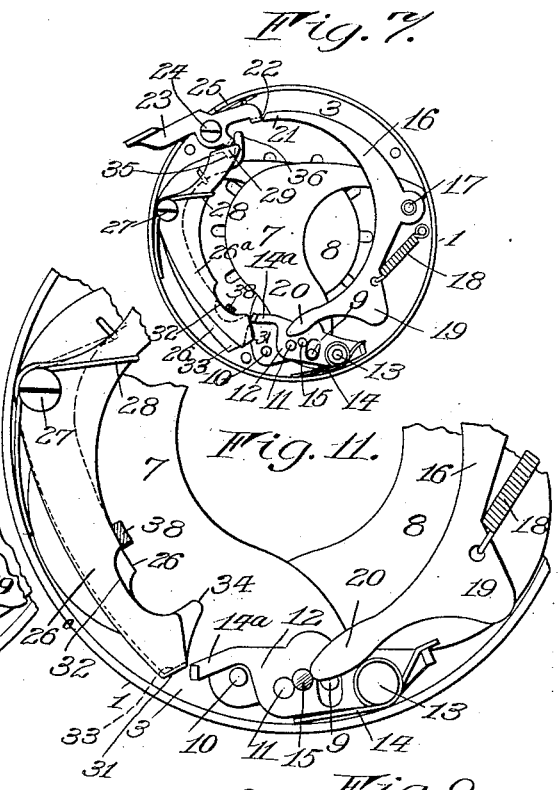
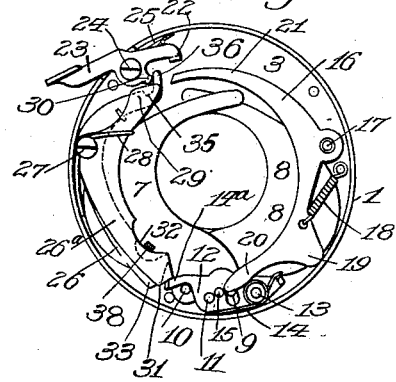
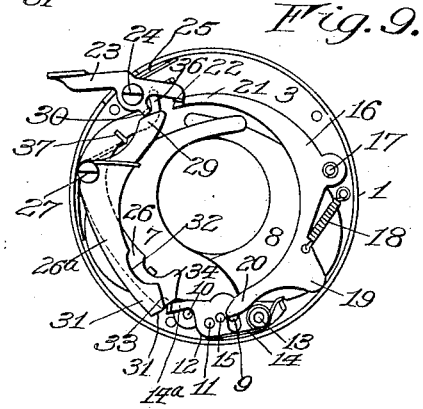
Witnesses.  
Walter B. Payne  
Florence E. Franck
Inventor.  
Rudolph Klein  
by Frederick F. Church  
His Attorney.

No. 839,154. PATENTED DEC. 25, 1906.
R. KLEIN.
PHOTOGRAPHIC SHUTTER.
APPLICATION FILED MAY 27, 1905.

3 SHEETS—SHEET 3.

Witnesses
Walter B. Payne.
Clarence A. Bateman.

Inventor
Rudolph Klein
By Frederick H. Church
Attorney

UNITED STATES PATENT OFFICE.

RUDOLPH KLEIN, OF ROCHESTER, NEW YORK, ASSIGNOR TO BAUSCH & LOMB OPTICAL COMPANY, OF ROCHESTER, NEW YORK, A CORPORATION OF NEW YORK.

PHOTOGRAPHIC SHUTTER.

No. 839,154.   Specification of Letters Patent.   Patented Dec. 25, 1906.

Application filed May 27, 1905. Serial No. 262,570.

*To all whom it may concern:*

Be it known that I, RUDOLPH KLEIN, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference-numerals marked thereon.

My present invention relates to improvements in photographic shutters, and has for its purpose to provide a shutter which can be made cheaply and which is capable of making the so-called "time," "bulb," and "instantaneous" or "snap-shot" exposures, the mechanism being so simplified as to insure the reliable operation of the parts for the different exposures.

To these and other ends my invention consists in certain improvements and combinations and arrangements of parts that will be hereinafter more fully described, the novel features being pointed out particularly in the claims.

Figure 1:
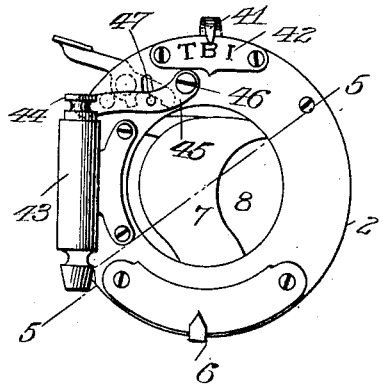
Figure 2:
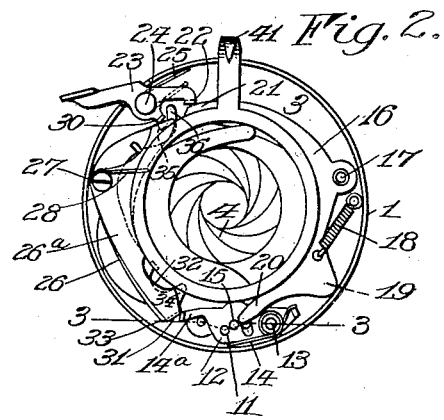
Figure 3:
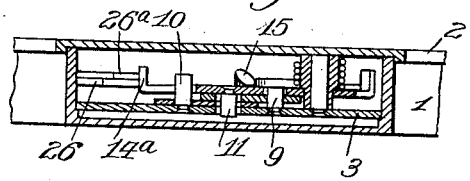
Figure 4:
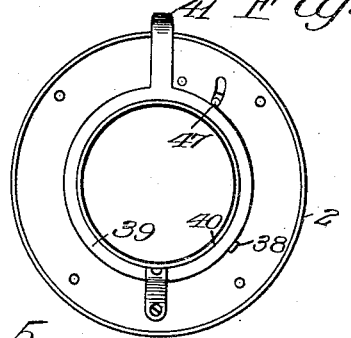
Figure 5:
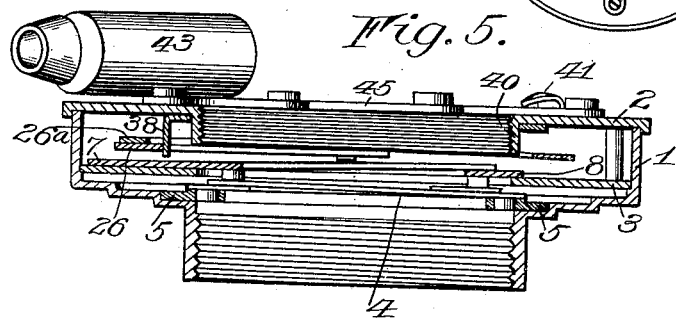
Figure 12:
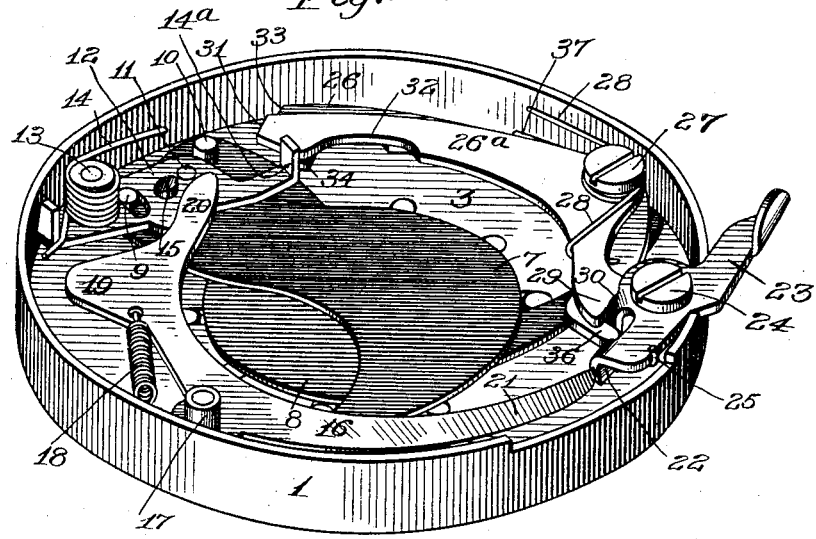

In the drawings, Figure 1 is a front elevation of a shutter constructed in accordance with my invention, the shutter-blades being shown closed. Fig. 2 is a view of the shutter with the front plate or cover removed, the shutter-blades being shown open with the mechanism in position for time exposure. Fig. 3 represents a section on the line 3 3 of Fig. 2, the parts being on an enlarged scale. Fig. 4 is a view of the under side of the front plate or cover having the adjusting device thereon. Fig. 5 represents a transverse section through the shutter on the line 5 5 of Fig. 1. Figs. 6, 7, 8, and 9 show the successive positions assumed by the parts during a manually-timed exposure. Figs. 10 and 11 are sectional views of a portion of the shutter, showing the adjusting device set, respectively, for bulb and instantaneous exposures; and Fig. 12 is a perspective view showing the latch connection between the operating and master members.

The invention in its present form is shown as applied to a shutter of the type wherein the mechanism is contained within a casing which is formed to receive the lenses and adapted to be secured to the camera-front, the casing in the present embodiment of the invention being formed of a hollow rear portion 1, adapted to inclose the shutter mechanism and provided with an attaching-tube for entering the camera and receiving the posterior lens elements, a cover 2 being fitted on the front of the casing and provided with a portion formed to receive the anterior lens elements. Within this casing is provided a septum 3, at one side of which an adjustable diaphragm 4 of any desired form is arranged, an adjusting-ring 5 being attached to the latter and provided with an index-pointer 6, which is located at the exterior of the casing to enable the diaphragm to be readily adjusted to vary the size of the aperture between the lens elements. On the opposite side of the septum are pivoted the shutter-blades 7 and 8, having the pivots 9 and 10, respectively, and these blades are slotted at points adjacent to their pivots to receive a projection 11, fixed to an exposure member 12, the latter being pivoted at 13 and provided with an operating-spring 14, which normally tends to operate the exposure member to close the shutter-blades, the free end of the exposure member being provided with a projection 14$^a$ and a lateral projection 15, which is beveled at one side. At one side of the casing is arranged a master member 16, which is preferably curved to enable it to fit compactly within the casing and is pivoted intermediately of its length, as at 17, a spring 18 being provided which normally tends to retain the said member in such a position that the stop 19 thereon rests against the adjacent wall of the casing.

Either end of the master member is capable of being displaced laterally relatively to its plane of motion, the end 20 thereof being formed to spring laterally when passing over the beveled or inclined portion of the projection 15 of the exposure member 12 while the master member is being operated against the action of its spring 18 and to engage behind the projection by returning to its normal plane after pasing the incline of the projection. The opposite end 21 of the master member is formed with an incline, whereby the lateral projection 22 of the operating member 23, which is pivoted at 24, may ratchet over the incline of the master member when the operating member is returning from operated position, and when the latter is moving toward its operated position it will operatively engage the master member to operate the latter against the action of its spring. The operating member is preferably provided with a spring 25 for returning it to normal position after being operated, as this requires the operator to move the said member in one direction only.

The master, operating, and exposure members thus far described are sufficient for causing an instantaneous opening and closing of the shutter-blades, as each motion of the operating member toward operated position will cause the lateral projection 22 thereon to engage the master member, causing the latter to be operated about its pivot and against the action of its spring 18 and the master member operating in the direction will cause the end 20 thereof to pass over the incline of the projection 15 and engage behind the latter. As the operating and master members are mounted to swing on different pivots and as the coöperating end 21 of the master member is of a certain length relatively to the projection 22 of the operating member and the parts move in different arcs, the operating and master members will disengage immediately after the master member has moved sufficiently far for its end 20 to engage behind the projection 15 of the exposure member and the master member operating under the action of its spring 18 will cause the exposure member to operate against the action of its spring to open the shutter-blades. As the master and operating members are pivoted on different centers, the projection 15 will disengage from the end 20 of the master member after the operating member has operated sufficiently to fully open the shutter-blades, and under the action of the spring 14 the operating member will immediately close the shutter-blades. However, it is generally desirable to provide for time and also bulb exposures for the shutter, and therefore I employ controlling devices whereby the operation of the shutter-blades may be suitably controlled, so as to make the desired exposures. In the present embodiment of my invention these controlling devices embody time and bulb stops 26 and 26ª, respectively, the latter being pivoted at a point intermediate its ends, as at 27, and is provided with a spring 28 normally operating to retain the end 29 of the stop in engagement with the projection 30 of the operating member and to move the heel 31 of the stop into the path of the projection 14 of the exposure member as the operating member is moved toward its exposed position, a cut-away portion or recess 32 being provided in the stop near the heel 31 thereof for a purpose that will presently appear. The time-stop 26 is conveniently mounted on the same pivot 27 with the bulb-stop and is provided at one end with a heel 33, corresponding to the heel of the bulb-stop and arranged to swing in the path of the projection 14ª of the exposure member to prevent operation of the latter to close the shutter, and an abutment 34 being arranged adjacent to the heel to coöperate with the projection 14ª of the exposure member when the latter occupies any position excepting the exposing position, and thereby prevent operation of the time-stop. The opposite end of the time-stop is formed with a recess 35 therein to receive the projection 30 of the operating member, a finger 36 being provided at one side of the recess which is normally held in engagement with the projection 30 of the operating member under the action of a spring 37. Adjacent to the heel 33 of the time-stop a cut-away portion is formed of a length less than that of the bulb-stop for a purpose to be described. The normal tendency of the bulb and time stops operating under the action of their respective springs is to move their heels into the path of the projection 14ª of the exposure member, and their operation is controlled by the projection 30 of the operating member and by the projection 38, carried on a rotatable ring 39, which is mounted to turn about the shoulder 40 at the rear side of the cover, a hand or pointer 41 being attached to the adjusting-ring and extended through the casing to coöperate with an index or scale 42 and for enabling the operator to readily adjust the shutter for the different exposures.

Time exposures with a shutter of the kind hereinbefore described are obtained by setting the pointer at the mark "T" of the scale 42. By referring to Figs. 6 to 9 of the drawings it will be observed that the projection 38 at this adjustment of the pointer will rest opposite to the cut-away portions of both the bulb and time stops, and they are therefore free to operate, and starting with the parts in the normal positions (shown in Fig. 6) it will be assumed that the operating member is depressed, as shown in Fig. 7, causing the projection 22 thereon coöperating with the end 21 of the master member to swing the latter until the portion 20 thereof passes over the inclined portion and engages above the projection 15 of the exposure member 12. Continued motion of the operating member toward its operated position will cause the projection 22 of the operating member to immediately disengage from the upper end 21 of the master member, and the latter operating under the action of its spring 18 will operate the exposure member to open the shutter-blades, and at this point in the motion of the exposure member the projection 15 thereon will move off the end 20 of the master member.

During the time the master member is being thus operated to open the shutter-blades the projection 30 of the operating member will move back, followed by the engaging portion 29 of the bulb-stop, permitting the heel portion of the latter to project into the path of the projection 14ª of the exposure member under the action of the spring for the bulb-stop, and therefore when the exposure member is operated by the master member to open the shutter-blades the heel of the bulb-stop will spring behind the projection 14ª of the exposure member to retain the latter in operated position with the shutter-blades open. As the operating member returns toward its normal position under the action of its spring after being released the projection 30 thereon coöperating with the engaging portion 29 of the bulb-stop will depress the latter, causing the heel thereof to be drawn out of its position above the projection 14ª of the operating member, but simultaneously with the retraction of the bulb-stop the projection 30 of the operating member coöperating with the finger 36 of the time-stop will move in such a path as to allow the latter under the action of its spring to move its heel portion across the path of the projection 14ª of the exposure member just before the heel of the bulb-stop disengages therefrom, and the return motion of the operating member will be arrested by the projection 30 thereon resting in the recess 35 of the time-stop, and this will prevent the projection 22 from engaging the corresponding portion 21 of the master member to operate it, the positions of the parts at this time being shown in Fig. 9. The heel of the bulb-stop projects somewhat beyond that of the time-stop, and consequently at the next operation of the operating member the projection 30 of the latter coöperating with the finger 36 of the time-stop will cause the latter to swing back and withdraw its heel from engagement with the projection 14ª of the exposure member, the heel of the bulb-stop during this operation projecting somewhat beyond the heel of the time-stop and abutting against the side of the projection 14ª and being thereby prevented from moving into the path of motion of this projection, and therefore when the operating member has been depressed sufficiently far the heel of the time-stop will be completely withdrawn from the path of the projection 14ª, and the exposing member 12 operating under the action of its spring will close the shutter-blades, the operating member being free to return to normal position, so that its projection 22 is in readiness to coöperate with the engaging portion 21 of the master member for the next exposure.

Bulb exposures are obtained by setting the pointer to the mark "B" on the index-plate of the cover, as this will shift the projection 38 into a position opposite to the cut-away portion of the bulb-stop, so as to permit its operation, but will engage the time-stop to prevent its operation, as will be understood from Fig. 10 of the drawings. When assuming that the operating member is depressed, the master member will be operated to open the shutter-blades through the exposing member 12, and during this operation the projection 30 of the operating member coöperating with the portion 29 of the bulb-stop will move up and permit the bulb-stop to operate under its spring, so that its heel will extend into the path of the projection 14ª of the exposure member, and as the exposure member is operated by the master member the projection 14ª thereon will pass the heel of the bulb-stop, which is held by spring-pressure, and will engage behind it, and thus retain the shutter-blades open during the time the operating member remains in operated position. When the operating member is released and returns to normal position, the projection 30 thereon will operate upon the bulb-stop to retract the heel thereof from the path of the projection 14ª of the exposure member, permitting the latter to operate under its spring to close the shutter-blades.

Instantaneous exposures are obtained by setting the pointer to the mark "I" on the index, and by referring to Fig. 11 it will be understood that this adjustment of the pointer will bring the projection 38 into position to engage and prevent the operation of either the bulb or time stop, and consequently when the operating member is depressed the master member will be operated, causing the portion 20 of the master member to ride over the incline of the projection 15 and engage behind the latter, and as the projection 22 of the operating member disengages from the portion 21 of the master member the latter, operating under the action of its superior spring 18, will cause the exposure member to be operated against the action of its comparatively weaker spring to open the shutter-blades. As the projection 15 of the exposure member and the coöperating portion 20 of the master member move in different arcs, they will disengage at a predetermined point while the shutter-blades are fully open, and the exposure member will immediately operate under the action of its spring to close the shutter-blades. At this time both the bulb and time stops are held out of the path of the projection 14ª of the exposure member, and therefore the latter is free to operate under the action of the master member.

The shutter is preferably provided with the ordinary cylinder or motor 43 for the attachment of the bulb and tube when it is desirable to operate the shutter in this way, the piston or plunger 44 being arranged to operate a lever 45, pivoted to the cover at 46 and provided with a projection 47, arranged to operate on the arm 48 of the operating member to cause operation of the latter in the well-known way.

By beveling or inclining the portion 21 of the master member so that it will form an operative connection with the projection 22 of the operating member when the latter is operated in one direction, but will spring laterally out of the plane of movement of the master member when the operating member is returned to normal position, a "latch connection," as I term it, is provided between the operating and master member which insures the coöperation of these parts without the necessity of intermediate devices, which would render the mechanism more complicated and costly, and a similar connection is provided between the master member and the operating member by providing the latter with the beveled pin 15, which permits the end 20 of the master member to pass it in moving in one direction, but forms an operative connection with it in moving in the opposite direction.

A photographic shutter constructed in accordance with my invention consists of a few simple parts which are so formed and arranged as to insure positive and reliable operation of the shutter for either the time-bulb or instantaneous exposures by the manipulation of a single part, and as the few parts of the shutter can be cheaply formed and readily assembled the cost of manufacturing shutters of this kind is materially reduced.

I claim as my invention—

1. In a photographic shutter, the combination with the shutter-blades, of a master member for operating the blades, and a stop for controlling the operation of the shutter-blades independently of the master member.

2. In a photographic shutter, the combination with the movable shutter-blades, and a spring-actuated exposure member normally operating to close them, of a master member for operating the exposure member to open the blades, and a movable stop for controlling the operation of the exposure member independently of the master member.

3. In a photographic shutter, the combination with the movable shutter-blades, and a spring-actuated exposure member normally operating to close them, of a master member for operating the exposure member in one direction only to open the blades, and a movable stop for controlling the operation of the exposure member in closing the blades.

4. In a photographic shutter, the combination with the movable shutter-blades, and a pivoted exposure member for operating the blades, of a master member having a latch connection with the exposure member for operating it and a stop for controlling the operation of the exposure member.

5. In a photographic shutter, the combination with the movable shutter-blades, and an exposure member for operating them, of a master member arranged to move freely relatively to the exposure member when operated in one direction, and causing the positive operation of the exposure member when moved in the opposite direction, and a stop acting directly on the exposure member for controlling its movement.

6. In a photographic shutter, the combination with the movable shutter-blades, and spring-actuated exposure member normally operating to close the blades, of a master member movable freely relatively to the exposure member when operated in one direction, and operating the exposure member to open the blades when moved in the opposite direction, and a controlling-stop adapted to coöperate with said exposure member when the latter is operating to close the blades.

7. In a photographic shutter, the combination with the movable shutter-blades, and an exposure member for operating them, of an operating member, a master member actuated by the operating member and arranged to coöperate with the exposure member to operate it, and a stop controlled by the operating member and coöperating with the exposure member for controlling the operation of the latter.

8. In a photographic shutter, the combination with the movable shutter-blades, and a spring-actuated exposure member normally operating to close the blades, of a master member for operating the exposure member to open the blades, an operating member arranged to coöperate with the master member, and a movable stop controlled by the operating member and coöperating with the exposure member for preventing operation of the exposure member to close the blades.

9. In a photographic shutter, the combination with the movable shutter-blades, and a spring-actuated exposure member for operating the blades, of a master member for operating the exposure member in one direction only, and a movable stop arranged to move into the path of the exposure member to control its operation in the opposite direction.

10. In a photographic shutter, the combination with the movable shutter-blades, and a spring-actuated exposure member for operating the blades, of a master member for operating the exposure member against its spring, an operating member for actuating the master member, and a movable stop arranged to move into and out of the path of the exposure member under the control of the operating member for preventing operation of the exposure member in the opposite direction.

11. In a photographic shutter, the combination with the movable shutter-blades, and a spring-actuated exposure member for operating the shutter-blades, having a lateral projection formed with an incline thereon, of a master member having a portion arranged to pass over the incline of the projection when the parts are moved relatively in one direction, and causing their positive operation when moved in the opposite direction, and timing-stops arranged to coöperate with said exposure member.

12. In a photographic shutter, the combination with the movable shutter-blades, and a spring-actuated exposure member normally operating to close the blades, having a lateral projection thereon formed with an incline thereon, of a pivoted master member having a portion arranged to pass over the incline of the projection when the parts are moved relatively in one direction, and causing the positive operation and release of the parts when moved in the opposite direction, and an exposure-controlling stop arranged to coöperate with said exposure member preceding its release.

13. In a photographic shutter, the combination with the movable shutter-blades, and a member for operating them, of means for controlling the operation of the blades embodying a pair of movable stops having recesses of different lengths extending transversely of the direction of movement of the stops, and a projection adjustable in the direction of the lengths of said recesses and adapted to enter and leave the latter during the operation of the stops by a relative movement in the direction of the lengths of the said recesses.

14. In a photographic shutter, the combination with the movable shutter-blades, and a member for operating them, of devices for controlling the operation of the blades embodying a pair of pivoted stops normally operating to prevent closing of the shutter-blades and having cut-away portions of different lengths extending substantially radially of the stops, and a projection capable of being adjusted in different positions relatively to the stops and their cut-away portions and arranged to enter the latter by a movement in the direction of their lengths for controlling the operation of the stops.

15. In a photographic shutter, the combination with the movable shutter-blades, of pivoted operating and exposure members having portions thereon normally operated toward each other, and a stop interposed between the said portions of the members for controlling the operation of one of them.

16. In a photographic shutter, the combination with the movable shutter-blades, a spring-actuated exposure member normally operating to close the blades, and a spring-actuated operating member having a portion thereon normally tending to move toward the exposure member, of controlling devices for the exposure member embodying a pair of spring-actuated stops interposed between the operating and exposure members.

17. In a photographic shutter, the combination with the movable shutter-blades, an operating member, and a spring-actuated exposure member normally operating in a direction toward the operating member to close the shutter-blades, of controlling devices for the blades embodying a pair of pivoted stops operating between the operating and exposure members, one of the stops having a recess therein to receive a portion of the operating member while the stop is coöperating with the exposure member to retain the latter in opened position.

18. In a photographic shutter, the combination with the movable shutter-blades, a spring-actuated exposure member normally coöperating to close the blades, a master member arranged to coöperate with the exposure member to open the blades, and an operating member arranged to coöperate with the master member when in normal position to operate it and having a projection thereon of controlling devices for the exposure member embodying a pivoted stop having a portion arranged to move into the path of the exposure member to prevent closing, said stop being provided with a recess to receive the projection and thus to permit the partial return of the operating member to normal position while the opposite end of the stop coöperates with the exposure member.

19. In a photographic shutter, the combination with movable shutter-blades, a pivoted exposure member normally operating to close them having a projection thereon, and an operating member having a projection thereon, of controlling devices for the exposure member embodying a pivoted stop having a heel at one end to engage the projection of the exposure member when the latter is in open position, and an abutment adjacent thereto arranged to coöperate with the projection of the exposure member when the latter is in position to close the blades, a notch or recess being formed in the opposite end of the stop to receive the projection of the operating member to arrest the latter's motion while the heel of the stop engages the projection of the exposure member, the notched or recessed portion of the stop being held out of engagement with the projection of the operating member by the abutment of the stop engaging at the side of the projection of the exposure member.

20. In a photographic shutter, the combination with the movable blades, the pivoted spring-actuated exposure member normally operating to close them, a spring-actuated master member arranged to coöperate with the exposure member to open the blades and release the exposure member by a continuous operation of the master member and an operating member arranged to operate and release the master member, of controlling devices acting upon the exposure member for controlling the operation of the shutter-blades independently of the master member.

RUDOLPH KLEIN.

Witnesses:
G. WILLARD RICH,
CLARENCE A. BATEMAN.